US012198619B2

(12) United States Patent
Gao et al.

(10) Patent No.: US 12,198,619 B2

(45) Date of Patent: Jan. 14, 2025

(54) PIXEL DRIVING CIRCUIT AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventors: Lei Gao, Shenzhen (CN); Zhenling Wang, Shenzhen (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/267,804

(22) PCT Filed: Dec. 31, 2020

(86) PCT No.: PCT/CN2020/142159

§ 371 (c)(1),
(2) Date: Sep. 25, 2023

(87) PCT Pub. No.: WO2022/141403

PCT Pub. Date: Jul. 7, 2022

(65) Prior Publication Data

US 2024/0005857 A1 Jan. 4, 2024

(30) Foreign Application Priority Data

Dec. 30, 2020 (CN) ........................ 202011599533.8

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2310/08* (2013.01)

(58) Field of Classification Search
CPC ......... G09G 3/3233; G09G 2300/0819; G09G 2300/0852; G09G 2310/08; G09G 2320/045; G09G 3/3208; G09G 3/3266
See application file for complete search history.

(56) References Cited

U.S. PATENT DOCUMENTS

2014/0168194 A1* 6/2014 Kong .................. G09G 3/3233 345/212
2016/0042694 A1* 2/2016 Lim ..................... G09G 3/3233 345/78

(Continued)

FOREIGN PATENT DOCUMENTS

CN 107767814 A 3/2018
CN 108231001 A 6/2018

(Continued)

*Primary Examiner* — Premal R Patel
(74) *Attorney, Agent, or Firm* — PV IP PC; Wei Te Chung

(57) ABSTRACT

The present disclosure proposes a pixel driving circuit and a display device. The pixel driving circuit comprises a driving transistor, a first data writing module and a second data writing module. The driving transistor comprises: a channel in a channel layer, a first gate in a first gate layer, and a second gate in a second gate layer, and an output end electrically connected to a light generating unit. The first gate and the second gate are respectively located at opposite sides of the channel. The first data writing module comprises an output end electrically connected to the first gate. The second data writing module comprises an output end electrically connected to the second gate.

19 Claims, 5 Drawing Sheets

(56) References Cited

U.S. PATENT DOCUMENTS

| | | | | |
|---|---|---|---|---|
| 2016/0260373 | A1* | 9/2016 | Miyake | G09G 3/2007 |
| 2016/0300900 | A1* | 10/2016 | Miyake | G09G 3/3233 |
| 2018/0090695 | A1 | 3/2018 | Maruyama | |
| 2019/0066587 | A1* | 2/2019 | Han | G09G 3/3258 |
| 2020/0219446 | A1* | 7/2020 | Yoshida | G09G 3/3291 |
| 2021/0265449 | A1* | 8/2021 | Son | H10K 59/126 |
| 2021/0287599 | A1* | 9/2021 | Kim | G09G 3/32 |

FOREIGN PATENT DOCUMENTS

| | | | |
|---|---|---|---|
| CN | 108257549 | A | 7/2018 |
| CN | 110036435 | A | 7/2019 |
| CN | 111312129 | A | 6/2020 |
| KR | 20180067768 | A | 6/2018 |

* cited by examiner

PIXEL DRIVING CIRCUIT AND DISPLAY DEVICE

FIELD OF THE INVENTION

The present disclosure relates to a display technology field, and more particularly, to a pixel driving circuit and a display device.

BACKGROUND

Compared with the conventional Liquid Crystal Display (LCD) technology, the Organic Light Emitting Diode (OLED) has a better contrast, a faster response speed and a wider view angles. Therefore, the OLED technology tends to replace the LCD technology and becomes the primary display technology.

The OLED is a current-driven device and is more sensitive in response to the electric characteristic variance of the thin film transistor (TFT). In particular, the variance of the threshold voltage and the mobility of the TFT may directly affect the display effect of the OLED device. The current flowing through the driving transistor is controlled by applying a voltage on the control end of the driving transistor. However, the electric field generated by the applied voltage will be applied on the electrons in the channel region and changes the threshold voltage and the mobility of the driving transistor. That is, when the applied voltage becomes higher, this means that the stress becomes greater. Accordingly, the threshold voltage of the driving transistor becomes greater and the mobility becomes lower. Furthermore, when threshold voltage of the driving transistor becomes greater and the mobility becomes smaller, the compensation capability of the compensation circuit needs to be higher and thus increases the cost of the OLED display.

Therefore, the conventional current-driven display device has issues of the high threshold voltage and the low mobility of the driving transistor caused by the applied voltage.

SUMMARY

Technical Problem

One objective of an embodiment of the present disclosure is to provide a pixel driving circuit and a display device to mitigate the above-mentioned issues of the high threshold voltage and the low mobility of the driving transistor caused by the voltage applied on the control end of the driving transistor.

Technical Solution

According to an embodiment of the present disclosure, a pixel driving circuit disclosed.

The pixel driving circuit comprises: a driving transistor, a first data writing module and a second data writing module.

The driving transistor comprises: a channel in a channel layer, a first gate in a first gate layer, and a second gate in a second gate layer, and an output end electrically connected to a light generating unit. The first gate and the second gate are respectively located at opposite sides of the channel.

The first data writing module comprises an output end electrically connected to the first gate.

The second data writing module comprises an output end electrically connected to the second gate.

In the pixel driving circuit of the present disclosure, a compensation module comprises an output end electrically connected to the output end of the driving transistor.

In the pixel driving circuit of the present disclosure, a first storage capacitor comprises a first end electrically connected to the first gate and a second end electrically connected to the output end of the driving transistor.

In the pixel driving circuit of the present disclosure, a second storage capacitor comprises a first end electrically connected to the second gate and a second end electrically connected to the output end of the driving transistor.

In the pixel driving circuit of the present disclosure, an input end of the first data writing module is electrically connected to a first data line, and the first date line is configured to input a first data signal into the first data writing module.

In the pixel driving circuit of the present disclosure, a control end of the first data writing module is electrically connected to a first scan line, wherein the first scan line is configured to input a first scan signal into the first data writing module.

In the pixel driving circuit of the present disclosure, the first data writing module further comprises a first transistor, having a gate electrically connected to the first scan line, a source electrically connected to the first data line, and a drain electrically connected to the first gate.

In the pixel driving circuit of the present disclosure, an input end of the second data writing module is electrically connected to a second data line and the second data line is configured to input a second data signal to the second data writing module.

In the pixel driving circuit of the present disclosure, a control end of the second data writing module is electrically connected to a second scan line, wherein the second scan line is configured to input a second scan signal into the second data writing module.

In the pixel driving circuit of the present disclosure, the second data writing module further comprises a second transistor, having a gate electrically connected to the second scan line, a source electrically connected to the second data line, and a drain electrically connected to the second gate.

In the pixel driving circuit of the present disclosure, the compensation module comprises a third transistor, having a gate electrically connected to a detecting signal line, a source electrically connected to a reference signal line, and a drain electrically connected to the output end of the driving transistor.

In the pixel driving circuit of the present disclosure, the driving transistor is an N-type transistor or a P-type transistor.

In the pixel driving circuit of the present disclosure, an input end of the driving transistor is electrically connected to a first power line, and the first power line is configured to provide a first power signal.

In the pixel driving circuit of the present disclosure, the output end of the driving transistor is electrically connected to a second power line through the light generating unit, and the second power line is configured to provide a second power signal.

In the pixel driving circuit of the present disclosure, an input end of the first data writing module and an input end of the second data writing module are electrically connected to a same data line.

In the pixel driving circuit of the present disclosure, a control end of the first data writing module and a control end of the second data writing module are electrically connected to a same scan line.

According to an embodiment of the present disclosure, a display device disclosed. The display device comprises the above-mentioned pixel driving circuit.

According to an embodiment of the present disclosure, a pixel driving circuit disclosed.

The pixel driving circuit comprises: a driving transistor, a first data writing module, a second data writing module, and a compensation module.

The driving transistor comprises a channel in a channel layer, a first gate in a first gate layer, and a second gate in a second gate layer, and an output end electrically connected to a light generating unit. The first gate and the second gate are respectively located at opposite sides of the channel.

The first data writing module comprises an output end electrically connected to the first gate.

The second data writing module comprises an output end electrically connected to the second gate. The compensation module comprises an output end electrically connected to the output end of the driving transistor.

In the display device, the pixel driving circuit further comprises a first storage capacitor and a second storage capacitor. The first storage capacitor comprises a first end electrically connected to the first gate and a second end electrically connected to the output end of the driving transistor. The second storage capacitor comprises a first end electrically connected to the second gate and a second end electrically connected to the output end of the driving transistor.

In the display device, the light generating unit comprises an anode electrically connected to the output end of the driving transistor, a light generating layer disposed on the anode, and a cathode disposed on the light generating layer.

Advantageous Effects

According to an embodiment of the present disclosure, the driving transistor has a dual-gate structure. Two data writing modules are used to write the data signals into the two gates of the driving transistor. This could reduce the voltage level applied on one gate and effectively control the threshold voltage and the mobility shifts of the driving transistor. Thus, the threshold voltage of the driving transistor could be maintained at a lower level and the demand for the driving capability of the driving voltage output circuit could also be reduced. This further reduces the cost.

BRIEF DESCRIPTION OF THE DRAWINGS

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

DETAILED DESCRIPTION OF PREFERRED EMBODIMENTS

Spatially relative terms, such as “beneath”, “below”, “lower”, “above”, “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures.

The present disclosure proposes a pixel driving circuit and a display device. The pixel driving circuit comprises a driving transistor, a first data writing module and a second data writing module. The driving transistor comprises: a channel in a channel layer, a first gate in a first gate layer, and a second gate in a second gate layer, and an output end electrically connected to a light generating unit. The first gate and the second gate are respectively located at opposite sides of the channel. The first data writing module comprises an output end electrically connected to the first gate. The second data writing module comprises an output end electrically connected to the second gate. According to an embodiment of the present disclosure, the driving transistor has a dual-gate structure. Two data writing modules are used to write the data signals into the two gates of the driving transistor. This could share the voltage load of a single gate and effectively control the threshold voltage and the mobility shifts of the driving transistor. Thus, the threshold voltage of the driving transistor could be maintained at a lower level and the demand for the driving capability of the driving voltage output circuit could also be reduced. This further reduces the cost.

Figure 1:
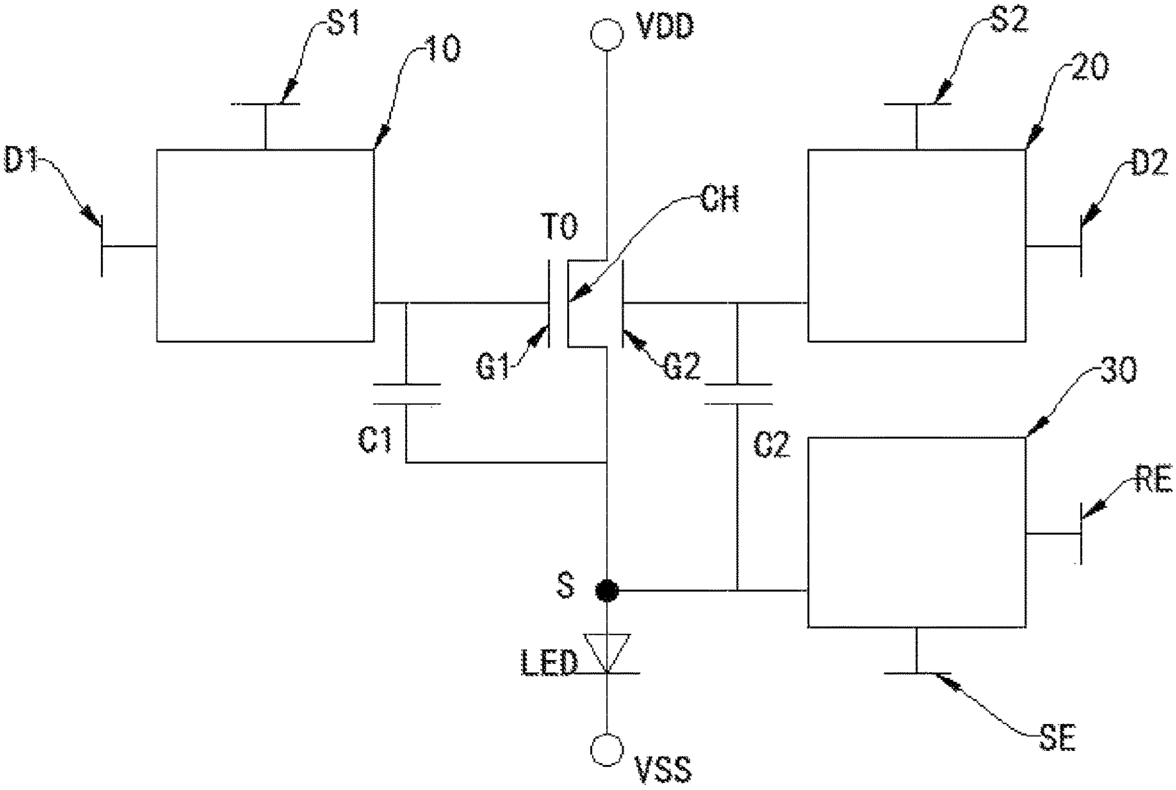
FIG. 1 is a diagram of a pixel driving circuit according to a first embodiment of the present disclosure.

Please refer to FIG. 1. FIG. 1 is a diagram of a pixel driving circuit according to a first embodiment of the present disclosure. The pixel driving circuit comprises a driving transistor T0, a first data writing module 10 and a second data writing module 20. The driving transistor T0 comprises a channel CH in the channel layer, a first gate G1 in the first gate layer, and a second gate G2 in the second gate layer. The first gate G1 and the second gate G2 are respectively located at opposite sides of the channel CH. The first data writing module 10 is electrically connected to the first gate G1. The second data writing module 20 is electrically connected to the second gate G2. The first data writing module 10 is used to transfer a first data signal to the first gate G1. The second data writing module 20 is used to transfer a second data signal to the second gate G2. The driving transistor T1 is turned on/off under the control of the first data signal and the second data signal. The output end of the driving transistor T0 is electrically connected to a light generating unit LED. When the driving transistor T0 is turned on, the current flows through the driving transistor T0 to the LED and thus the LED emits light. When the driving transistor T0 is turned off, the current flowing through the LED is cut off and thus the LED does not generate light.

The first data signal and the second data signal are both voltage signals. The driving transistor T0 could be an N-type transistor or a P-type transistor. When the driving transistor T0 is an N-type transistor and the sum of the first data signal and the second data signal is a positive voltage signal higher than the threshold voltage of the driving transistor T0, the driving transistor T0 is turned on. When the driving transistor T0 is a P-type transistor and the sum of the first data signal and the second data signal is a negative voltage signal greater than the threshold voltage of the driving transistor T0, the driving transistor T0 is turned on. In this embodiment, the driving transistor T0 is an N-type transistor but this is an example, not a limitation of the present disclosure. One having ordinary skills in the art could easily understand the operation and configuration when the driving transistor T0 is implemented with a P-type transistor based on the following disclosure under the condition that the driving transistor T0 is implemented with an N-type transistor In this embodiment, the driving transistor T0 has a dual-gate structure. Furthermore, two data writing modules are used to transfer the data signals into the two gates of the driving transistor. The driving transistor could be turned on as long as the sum of the voltages applied on the two gates is higher than the threshold voltage of the driving transistor. This is equivalent to split the voltage, which needs to be applied on a single gate structure, into two parts and apply the part on each of the gate. This ensures that the gate at one side only need a lower voltage to turn on the driving transistor and effectively control the stress caused by an overly-large control voltage and the issues of threshold voltage and mobility shifts.

In addition, if the gate at one side has a higher gate voltage, the corresponding stress is larger and makes the threshold voltage of the driving transistor higher. In this way, the driving voltage for driving the driving transistor needs to be higher and thus the demands for the driving capability of the driving voltage output circuit become higher. In this embodiment, the pixel driving circuit could effectively control the increase of the threshold voltage of the driving transistor and reduce the demand for output capability of the driving voltage output circuit. Accordingly, the cost could be reduced.

For example, in the pixel driving circuit according to an embodiment, the threshold voltage of the driving transistor T0 is 1V and an ideal driving voltage for eliminating the LED is 4V. in this way, the sum of the voltages applied on the first gate G1 and the second gate G2 needs to be at least 5V. If the voltages applied on the first gate G1 and the second gate G2 are equal, then the voltage applied on each of the gate needs only 2.5V. Therefore, compared with the single-gate structure of the driving transistor which needs a 5V driving voltage, this embodiment only needs a lower gate voltage. Thus, this embodiment could effectively control the corresponding electric stress caused by the applied gate voltage and control the threshold voltage and mobility shifts.

The input end of the first data writing module 10 is electrically connected to the first data line D1. The first data line D1 is used to write the first data signal into the first data writing module 10. The control end of the first data writing module 10 is electrically connected to the first scan line S1. The first scan line S1 is used to input the first scan signal into the first data writing module 10. The first data writing module 10 outputs the first data signal into the first gate G1 under the control of the first scan signal such that the driving voltage could be written into the first gate G1.

The input end of the second data writing module 20 is electrically connected to the second data line D2. The second data line D2 is used to write the second data signal into the second data writing module 20. The control end of the second data writing module 20 is electrically connected to the second scan line S2. The second scan line S2 is used to input the second scan signal into the second data writing module 20. The second data writing module 20 outputs the second data signal into the second gate G2 under the control of the second scan signal such that the driving voltage could be written into the second gate G2.

In an embodiment, the first data line D1 and the second data line D2 could be the same data line. The first data signal could be the same as the second data signal. The first scan line S1 and the second scan line S2 could be the same scan line. The first scan signal could be the same as the second scan signal. Because the first data line D1 and the second data line D2 could be the same data line and the first scan line S1 and the second scan line S2 could be the same scan line, this design could simplify the structure of the pixel driving circuit and reduce the layout space of the pixel driving circuit.

The output end of the driving transistor T0 is electrically connected to the first node S. The pixel driving circuit further comprises a compensation module 30. The output end of the compensation module 30 is electrically connected to the first node S. The input end of the compensation module 30 is electrically connected to the reference signal line RE. The reference signal line RE is used to input a reference signal to the compensation module 30. The control end of the compensation module 30 is electrically connected to a detection signal line SE. The detection signal line SE is used to input a detection signal to the compensation module 30. The compensation module 30 is used to output the reference signal to the first node S under the control of the detection signal to achieve the detection of the threshold voltage of the driving transistor T0.

The process that the compensation module 30 detects the threshold voltage of the driving transistor T0 comprises: the first data writing module 10 and the second data writing module 20 respectively transfer the voltage signals to the first gate G1 and the second gate G2 to form the gate voltages; the compensation module 30 transfers a voltage signal to the first node S to pull up the voltage level of the first node S; when the voltage level of the first gate G1 is pulled up to a cutoff voltage level, and the driving transistor T0 is switched from the "on" state to the "off" state; obtain the gate voltage of the driving transistor T0 and the cutoff voltage of the first node S and the difference between them to get the threshold voltage of the driving transistor T0.

The process of compensating the threshold voltage of the driving transistor T0 comprises: obtain the ideal driving voltage of the light generating unit LED in a normal operation; add the ideal driving voltage on the threshold voltage of the driving transistor T0 to obtain the actual driving voltage that should be applied on the gate of the driving transistor T0; and apply the actual driving voltage on the first gate G1 and the second gate G2.

The pixel driving circuit further comprises a first capacitor C1. The first end of the first storage capacitor C1 is electrically connected to the first gate G1. The second end of the first storage capacitor C1 is electrically connected to the first node S. the first storage capacitor C1 is used to store the voltage difference between the first gate G1 and the first node S.

The pixel driving circuit further comprises a second storage capacitor C2. The first end of the second storage capacitor C2 is electrically connected to the second gate G2. The second end of the second storage capacitor C2 is electrically connected to the first node S. The storage capacitor C2 is used to store the voltage difference between the second gate G2 and the first node S.

The input end of the driving transistor T0 is electrically connected to a first power line VDD. The first power line VDD is used to provide a first power signal. The output end of the driving transistor T0 is electrically connected to a second power line VSS through the LED. The second power line VSS is used to provide a second power signal. In an embodiment, the first power signal and the second power signal are both voltage signals. The first power signal is higher than the second power signal. For example, if the first power signal is 5V, the second power signal is 0V. When the driving transistor T0 is turned on, the two ends of the LED has a voltage difference of 5V and thus the current flowing through the LED could be generated to eliminate the LED.

Figure 2:
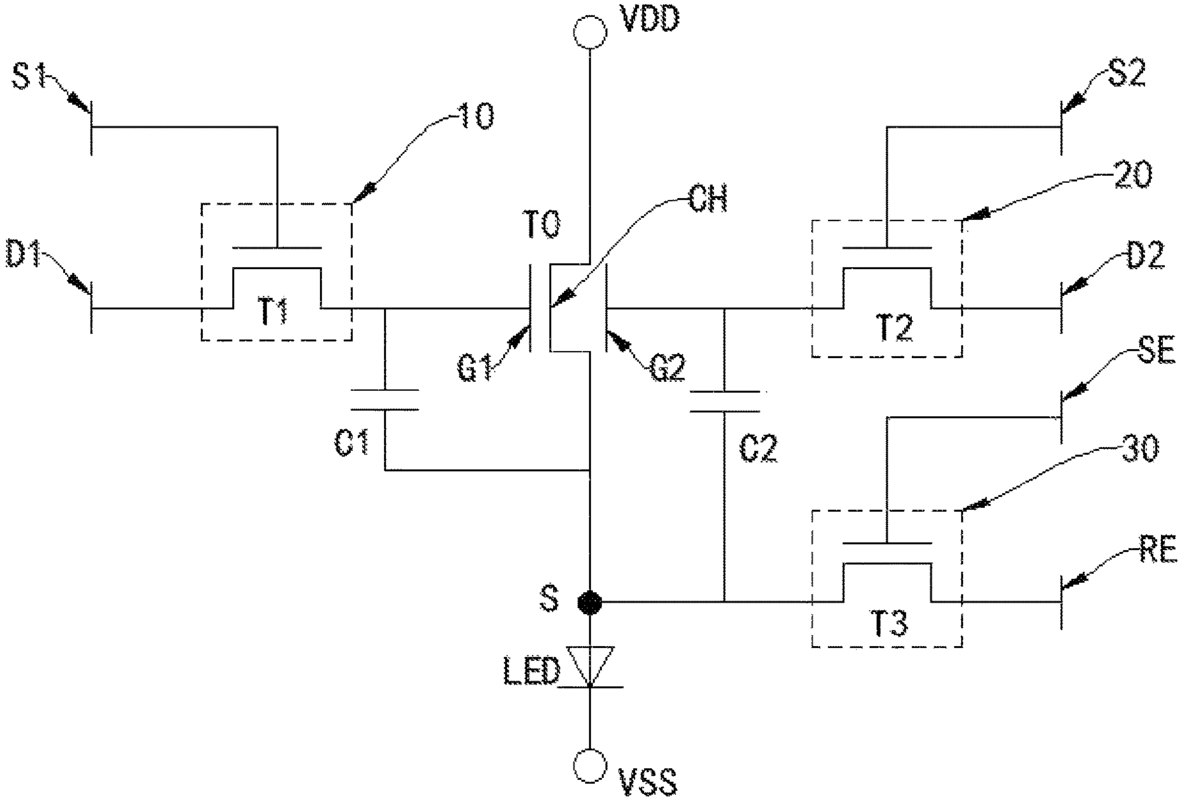
FIG. 2 is a diagram of a pixel driving circuit according to a second embodiment of the present disclosure.

Please refer to FIG. 2. FIG. 2 is a diagram of a pixel driving circuit according to a second embodiment of the present disclosure. The pixel driving circuit comprises a driving transistor T0, a first data writing module 10, a second data writing module 20, a compensation module 30, a first storage capacitor C1 and a second storage capacitor C2.

The driving transistor T0 comprises a channel CH in a channel layer, a first gate G1 in a first gate layer, and a second gate G2 in a second gate layer. The first gate G1 and the second gate G2 are respectively located at opposite sides of the channel CH. The first data writing module 10 is electrically connected to the first gate G1. The second data writing module 20 is electrically connected to the second gate G2. The first data writing module 10 is used to transfer a first data signal to the first gate G1. The second data writing module 20 is used to transfer a second data signal to the second gate G2. The driving transistor T1 is turned on/off under the control of the first data signal and the second data signal.

The input end of the driving transistor T0 is electrically connected to the first power line VDD. The first power line VDD is used to provide a first power signal. The output end of the driving transistor T0 is electrically connected to a light generating unit LED through a first node S. Another end of the LED is electrically connected to the second power line VSS. When the driving transistor T0 is turned on, the current flows through the driving transistor T0 to the LED and thus the LED emits light. When the driving transistor TO is turned off, the current flowing through the LED is cut off and thus the LED does not generate light.

The input end of the first data writing module 10 is electrically connected to the first data line D1. The first data line D1 is used to input the first data signal into the first data writing module 10. The control end of the first data writing module 10 is electrically connected to the first scan line S1. The first scan line S1 is used to input the first scan signal to the first data writing module 10. The first data writing module 10 outputs the first data signal to the first gate G1 under the control of the first scan signal. In this way, the driving voltage could be written into the first gate G1.

The first data writing module 10 comprises a first transistor T1. The gate of the first transistor T1 is electrically connected to the first scan line S1. The source of the first transistor T1 is electrically connected to the first data line D1. The drain of the first transistor T1 is electrically connected to the first gate. In an embodiment, the first transistor T1 could be an N-type transistor and a P-type transistor.

The input end of the second data writing module 20 is electrically connected to the second data line D2. The second data line D2 is used to input the second data signal to the second data writing module 20. The control end of the second data writing module 20 is electrically connected to the second scan line S2. The second scan line S2 is used to input the second scan signal to the second data writing module 20. The second data writing module 20 outputs the second data signal to the second gate G2 under the control of the second scan signal. In this way, the driving voltage could be written into the second gate G2.

The second data writing module 20 comprises a second transistor T2. The gate of the second transistor T2 is electrically connected to the second scan line S2. The source of the second transistor T2 is electrically connected to the second data line D2. The drain of the second transistor T2 is electrically connected to the second gate G2. In an embodiment, the first transistor T1 could be an N-type transistor and a P-type transistor.

The output end of the compensation module 30 is electrically connected to the first node S. The input end of the compensation module 30 is electrically connected to the reference signal line RE. The reference signal line RE is used to input a reference signal to the compensation module 30. The control end of the compensation module 30 is electrically connected to the detection signal line SE. The detection signal line SE is used to input a detection signal to the compensation module. The compensation module 30 is used to output the reference signal to the first node S under the control of the detection signal to achieve the detection of the threshold voltage of the driving transistor T0.

The compensation module 30 comprises a third transistor T3. The gate of the third transistor T3 is electrically connected to the detection signal line SE. The source of the third transistor T3 is electrically connected to the reference signal line RE. The drain of the third transistor T3 is electrically connected to the first node S. In an embodiment, the third transistor T3 could be an N-type transistor and a P-type transistor.

The first end of the first storage capacitor C1 is electrically connected to the first gate G1. The second end of the first storage capacitor C1 is electrically connected to the first node S. The first storage capacitor C1 is used to store the voltage difference between the first gate G1 and the first node S.

The first end of the second storage capacitor C2 is electrically connected to the second gate G2. The second end of the second storage capacitor C2 is electrically connected to the first node S. The storage capacitor C2 is used to store the voltage difference between the second gate G2 and the first node S.

The driving transistor T0 has a dual-gate structure. Two data writing modules are used to transfer the data signals into the two gates of the driving transistor. The driving transistor could be turned on as long as the sum of the voltages applied on the two gates is higher than the threshold voltage of the driving transistor. This is equivalent to split the voltage, which needs to be applied on a single gate structure, into two parts and apply the part on each of the gate. This ensures that the gate at one side only need a lower voltage to turn on the driving transistor and effectively control the stress caused by the gate voltage and the issues of threshold voltage and mobility shifts. In addition, if the gate voltage applied on one side of the gate of the driving transistor, the electric stress is greater and the threshold voltage of the driving transistor becomes higher. In this way, the driving voltage that needs to be applied on the gate of the driving transistor becomes higher. This means that the demands for the output capability of the driving voltage output circuit becomes higher and increases the cost. In this embodiment, the pixel driving circuit could effectively control the increase of the threshold voltage of the driving transistor and reduce the demands for the output capability of the driving voltage output circuit. Accordingly, the cost is reduced.

In an embodiment, the first data line D1 and the second data line D2 could be the same data line. Correspondingly, the first data signal and the second data signal could be the same. The first scan line S1 and the second scan line S2 could be the same scan line. Correspondingly, the first scan signal and the second scan signal could be the same. Because the first data line D1 and the second data line D2 could be the same and the first scan line S1 and the second scan line S2 could be the same, this design could simplify the structure of the pixel driving circuit and reduce the layout space of the pixel driving circuit.

Figure 3:
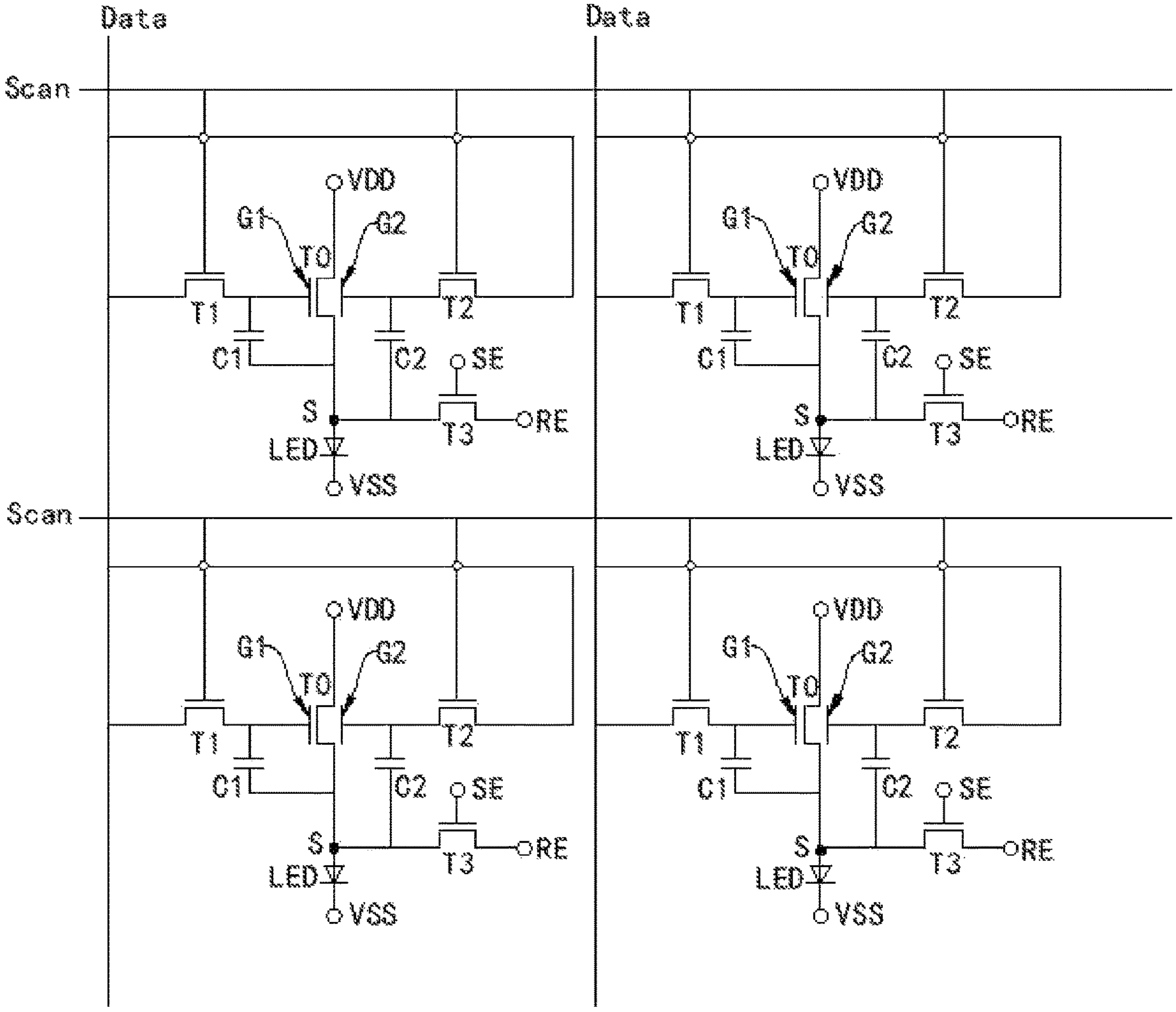
FIG. 3 is a diagram showing a layout of the pixel driving circuit shown in FIG. 2.

Please refer to FIG. 2 and FIG. 3. FIG. 3 is a diagram showing a layout of the pixel driving circuit shown in FIG. 2. The display device comprises a plurality of pixel driving circuits. Each of the pixel driving circuits corresponds to a display unit or a pixel unit of the display device. FIG. 3 only depicts a layout structure of neighboring four pixel driving circuits. One having ordinary skills in the art could understand the layout structure of other pixel driving circuits in the display device according to the disclosure of the present disclosure.

The input end of the first data writing module 10 and the input end of the second data writing module 20 of the pixel driving circuit are electrically connected to the same data line Data. The control end of the first data writing module 10 and the control end of the second data writing module 20 are electrically connected to the same scan line Scan. In this embodiment, further structure of the pixel driving circuit could be referred to the above embodiment and thus further illustration is omitted.

In this embodiment, the distribution and the connections of multiple pixel driving circuits have following characteristics: multiple pixel driving circuits are distributed in an N*M matrix where N and M are integers; the first data writing modules 10 and the second data writing modules 20 of pixel driving circuits of the same row receive the scan signal from the same scan line, the first data writing modules 10 and the second data writing modules 20 of pixel driving circuits of the same column receives the data signals from the same data line.

In contrast to the conventional art, the present disclosure increases the number of gates and the number of data writing modules in the driving transistor without increasing the numbers of scan lines and data lines. Therefore, the present disclosure does not increase the complexity of the layout of the pixel driving circuit in the display device.

Figure 4:
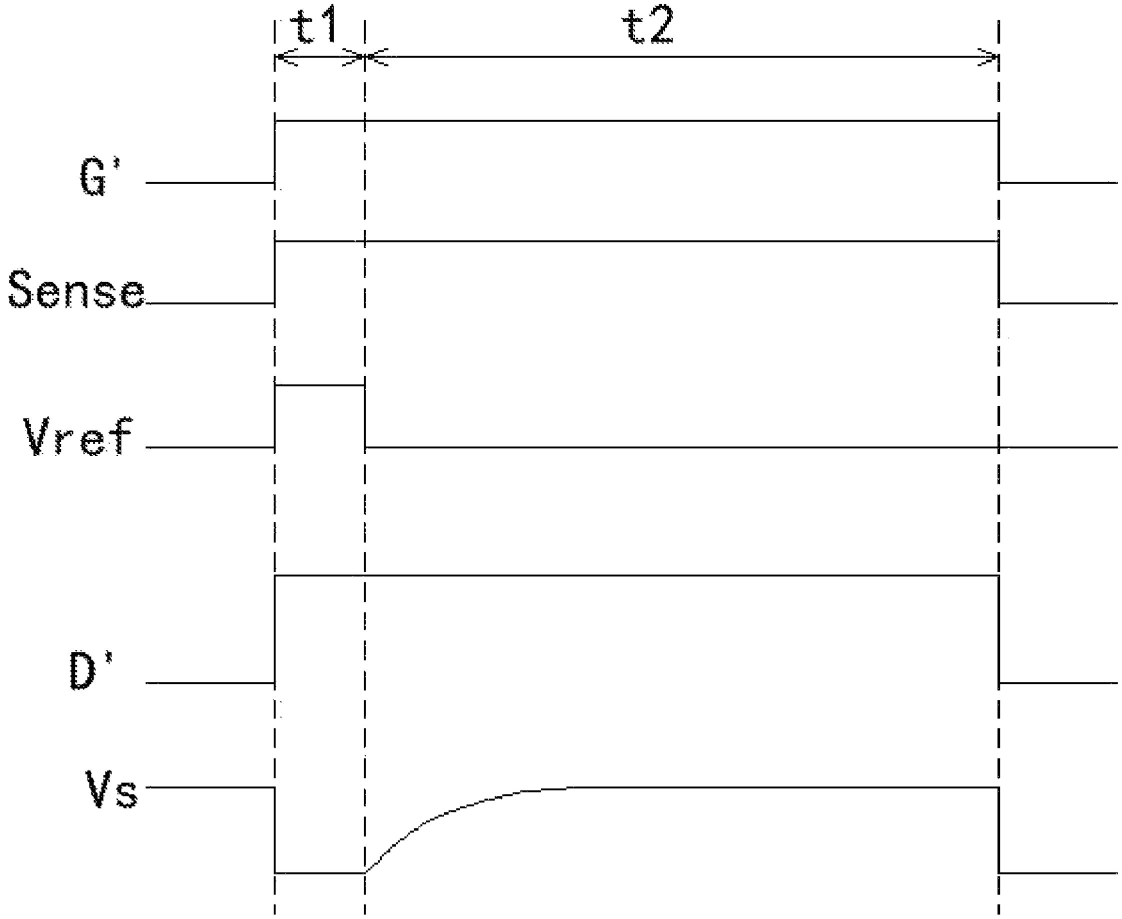
FIG. 4 is a timing diagram in the threshold voltage detecting phase of the pixel driving circuit shown in FIG. 2.

Please refer to FIG. 2 to FIG. 4. FIG. 4 is a timing diagram in the threshold voltage detecting phase of the pixel driving circuit shown in FIG. 2. Here, the input end of the first data writing module 10 and the input end of the second data writing module 20 of the pixel driving circuit are both electrically connected to the same data line Data. The data line Data transfers the data signal D' into the first data writing module 10 and the second writing module 20. The control end of the first writing module 10 and the control end of the second writing module 20 are electrically connected to the same scan line Scan. The scan line Scan transfers the scan signal G' to the first data writing module 10 and the second data writing module 202. The input end of the compensation module 30 is electrically connected to the reference signal line RE. The reference signal line RE is used to input the reference signal Vref to the compensation module 30. The control end of the compensation module 30 is electrically connected to the detection signal line SE. The detection signal line SE is used to input the detection signal Sense to the compensation module 30. The output end of the compensation module 30 is electrically connected to the first node S. The voltage level of the node S is labeled as the node voltage level Vs.

The timing diagram of FIG. 4 corresponds to the voltage variance of each of the signals of the pixel driving circuit in the threshold voltage detecting phase.

In the first time period t1, the scan signal G' and the data signal D' are both corresponding to a high voltage level. The first transistor T1 and the second transistor T2 are turned on. The first gate G1 and the second gate G2 of the driving transistor T0 receive the data signal D' of a high voltage level and the first end of the first storage capacitor C1 and the first end of the second storage capacitor C2 are both corresponding to a high voltage level. The detection signal Sense corresponds to a high voltage level and thus the third transistor T3 is turned on. The reference signal Vref resets the node voltage level Vs of the first node and maintains the node voltage level Vs to be a low voltage level.

In the second time period t2, the driving transistor T0 is turned on. The voltage difference between the first power line VDD and the second power line VSS gradually pulls up the node voltage level Vs of the first node S and the node voltage level Vs finally reaches the cutoff voltage and becomes stable. After the node voltage level Vs reaches the cutoff voltage, node voltage level Vs, the difference between the gate voltage Vg of the driving transistor T0 (the sum of the voltage on the first gate and the voltage on the second gate) and the node voltage level Vs is equal to the threshold voltage Vth of the driving transistor and the driving transistor T0 is cut off. According to the relationship among the gate voltage Vg, the node voltage level Vs and the threshold voltage Vth: $Vth=Vg-Vs$, the threshold voltage Vth of the driving transistor T0 could be calculated. Please note, the node voltage level Vs could be measured by connecting the source of the third transistor T3 to an analog-to-digital converter (ADC).

After the threshold voltage of the driving transistor T0 is detected in the threshold voltage detecting phase, the compensation method for compensating the driving transistor TO is: obtain an ideal driving voltage required for the LED to generate light; add the threshold voltage of the driving transistor T0 on the ideal driving voltage to obtain the needed driving voltage to be applied on the gate of the driving transistor; apply the needed driving voltage on the first gate G1 and the second gate G2.

From the above, the present disclosure proposes a pixel driving circuit. The pixel driving circuit comprises a driving transistor, a first data writing module and a second data writing module. The driving transistor comprises: a channel in a channel layer, a first gate in a first gate layer, and a second gate in a second gate layer, and an output end electrically connected to a light generating unit. The first gate and the second gate are respectively located at opposite sides of the channel. The first data writing module comprises an output end electrically connected to the first gate. The second data writing module comprises an output end electrically connected to the second gate. an embodiment of the present disclosure makes the driving transistor have a dual-gate structure. Two data writing modules are used to write the data signals into the two gates of the driving transistor. This could share the voltage load of a single gate and effectively control the threshold voltage and the mobility shifts of the driving transistor. Thus, the threshold voltage of the driving transistor could be maintained at a lower level and the demand for the driving capability of the driving voltage output circuit could also be reduced. This further reduces the cost.

According to an embodiment of the present disclosure, a display device is disclosed. The display device comprises the above-mentioned pixel driving circuit.

Figure 5:
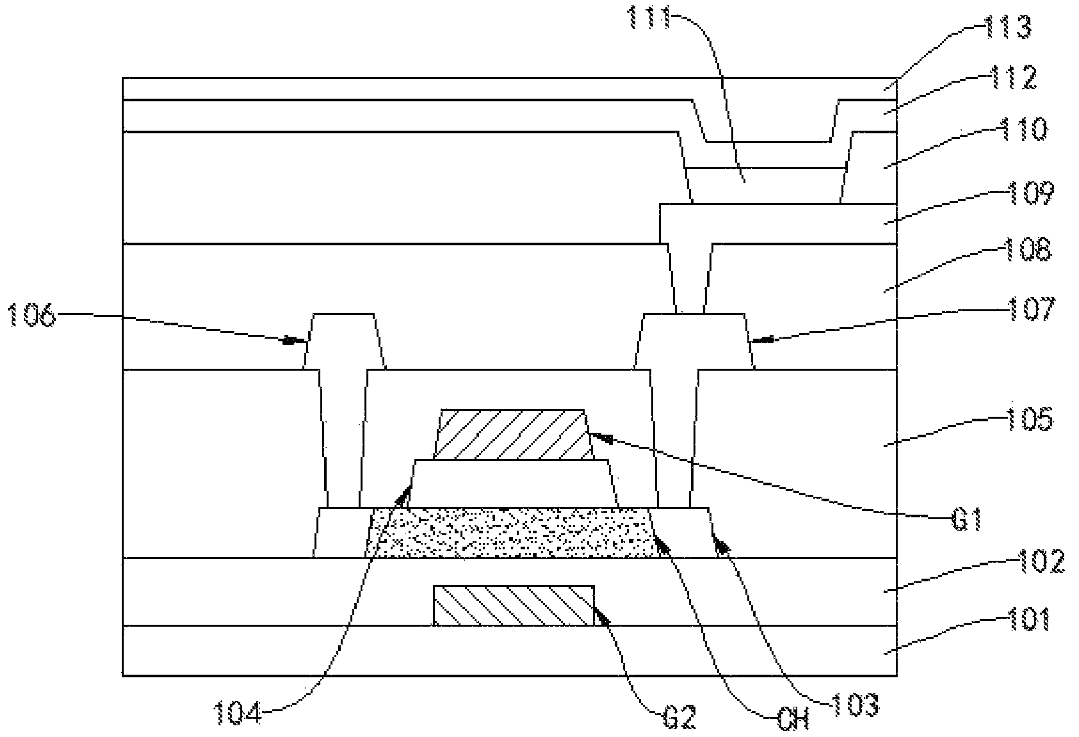
FIG. 5 is a cross-section diagram of a display device according to an embodiment of the present disclosure.

Please refer to FIG. 5. FIG. 5 is a cross-section diagram of a display device according to an embodiment of the present disclosure. The display device could be an OLED display device or a Mini LED display device. The display device comprises a substrate 101, a second gate G2 on the substrate 101, a second gate insulating layer 102 covering the second gate G2, a channel layer 103 on the second gate insulating layer 102, a first gate insulating layer 104 on the channel layer, a first gate on the first insulating layer 104, an interlayer insulating layer 105 covering the channel layer 103, the first gate insulating layer 104 and the first gate G1, a source 106 and a drain 107 on the interlayer insulating layer 105, a planarization layer 108 on the interlayer insulating layer 105, the anode 109 and a pixel definition layer 101 on the planarization layer 108, a light generating layer 111 in the holes of the pixel definition layer 110, a cathode 112 on the pixel definition layer 110, and a packaging layer 113 on the cathode 112.

The source 106 and the drain 107 are respectively connected to the opposite ends of the active layer 103 through the vias in the interlayer insulating layer 105. The channel layer 103 comprises the channel CH. The first gate G1 and the second gate G2 are respectively located at the opposite sides of the channel CH. The second gate G2, the channel layer 103, the first gate G1, the source 106 and the drain 107 constitute a dual-gate driving transistor, which can be any of the driving transistors TO shown in FIG. 1, FIG. 2 and/or FIG. 3.

The anode 109 is electrically connected to the drain 107 through the via in the planarization layer 108. The light generating layer 111 is electrically connected to the anode. The cathode 112 is electrically connected to the light generating layer 111. The anode 109, the light generating layer 111 and the cathode 112 constitute a light generating unit, which can be any of the LEDs shown in FIG. 1, FIG. 2, and/or FIG. 3.

According to an embodiment of the present disclosure, the driving transistor has a dual-gate structure. Two data writing modules are used to write the data signals into the two gates of the driving transistor. This could reduce the voltage level applied on one gate and effectively control the threshold voltage and the mobility shifts of the driving transistor. Thus, the threshold voltage of the driving transistor could be maintained at a lower level and the demand for the driving capability of the driving voltage output circuit could also be reduced. This further reduces the cost.

Above are embodiments of the present disclosure, which does not limit the scope of the present disclosure. Any modifications, equivalent replacements or improvements within the spirit and principles of the embodiment described above should be covered by the protected scope of the invention.

What is claimed is:

1. A pixel driving circuit, comprising:

a driving transistor, comprising:

a channel in a channel layer;

a first gate in a first gate layer; and a second gate in a second gate layer, wherein the first gate and the second gate are respectively located at opposite sides of the channel; and an output end, electrically connected to a light generating unit;

a first data writing module, comprising an output end electrically connected to the first gate; and a second data writing module, comprising an output end electrically connected to the second gate;

wherein the pixel driving circuit further comprises a compensation module, having an output end electrically connected to the output end of the driving transistor; and the compensation module is configured to: obtain a first driving voltage of the light generating unit in a normal operation; add the first driving voltage on a threshold voltage of the driving transistor to obtain a second driving voltage that should be applied on the driving transistor; and apply the second driving voltage on the first gate and the second gate.

2. The pixel driving circuit of claim 1, further comprising:

a first storage capacitor, having a first end electrically connected to the first gate and a second end electrically connected to the output end of the driving transistor.

3. The pixel driving circuit of claim 1, further comprising:

a second storage capacitor, having a first end electrically connected to the second gate and a second end electrically connected to the output end of the driving transistor.

4. The pixel driving circuit of claim 1, wherein an input end of the first data writing module is electrically connected to a first data line, and the first date line is configured to input a first data signal into the first data writing module.

5. The pixel driving circuit of claim 4, wherein a control end of the first data writing module is electrically connected to a first scan line, wherein the first scan line is configured to input a first scan signal into the first data writing module.

6. The pixel driving circuit of claim 5, wherein the first data writing module further comprises:

a first transistor, having a gate electrically connected to the first scan line, a source electrically connected to the first data line, and a drain electrically connected to the first gate.

7. The pixel driving circuit of claim 1, wherein an input end of the second data writing module is electrically connected to a second data line and the second data line is configured to input a second data signal to the second data writing module.

8. The pixel driving circuit of claim 7, wherein a control end of the second data writing module is electrically connected to a second scan line, wherein the second scan line is configured to input a second scan signal into the second data writing module.

9. The pixel driving circuit of claim 8, wherein the second data writing module further comprises:

a second transistor, having a gate electrically connected to the second scan line, a source electrically connected to the second data line, and a drain electrically connected to the second gate.

10. The pixel driving circuit of claim 1, wherein the compensation module comprises a third transistor, having a gate electrically connected to a detecting signal line, a source electrically connected to a reference signal line, and a drain electrically connected to the output end of the driving transistor.

11. The pixel driving circuit of claim 1, wherein the driving transistor is an N-type transistor or a P-type transistor.

12. The pixel driving circuit of claim 1, wherein an input end of the driving transistor is electrically connected to a first power line, and the first power line is configured to provide a first power signal.

13. The pixel driving circuit of claim 1, wherein the output end of the driving transistor is electrically connected to a second power line through the light generating unit, and the second power line is configured to provide a second power signal.

14. The pixel driving circuit of claim 1, wherein an input end of the first data writing module and an input end of the second data writing module are electrically connected to a same data line.

15. The pixel driving circuit of claim 1, wherein a control end of the first data writing module and a control end of the second data writing module are electrically connected to a same scan line.

16. A display device, comprising a pixel driving circuit of claim 1.

17. A display device, comprising a pixel driving circuit, the pixel driving circuit comprising:

a driving transistor, comprising:

a channel in a channel layer;

a first gate in a first gate layer; and a second gate in a second gate layer, wherein the first gate and the second gate are respectively located at opposite sides of the channel; and an output end, electrically connected to a light generating unit;

a first data writing module, comprising an output end electrically connected to the first gate;

a second data writing module, comprising an output end electrically connected to the second gate; and a compensation module, having an output end electrically connected to the output end of the driving transistor; and wherein the compensation module is configured to: obtain a first driving voltage of the light generating unit in a normal operation; add the first driving voltage on a threshold voltage of the driving transistor to obtain a second driving voltage that should be applied on the driving transistor; and apply the second driving voltage on the first gate and the second gate.

18. The display device of claim 17, wherein the pixel driving circuit further comprises:

a first storage capacitor, having a first end electrically connected to the first gate and a second end electrically connected to the output end of the driving transistor; and a second storage capacitor, having a first end electrically connected to the second gate and a second end electrically connected to the output end of the driving transistor.

19. The display device of claim 17, wherein the light generating unit comprises an anode electrically connected to the output end of the driving transistor, a light generating layer disposed on the anode, and a cathode disposed on the light generating layer.

* * * * *